United States Patent
Shah et al.

(10) Patent No.: US 9,253,692 B1
(45) Date of Patent: Feb. 2, 2016

(54) REUSE OF IDENTIFIERS FOR CONTENTION-FREE RANDOM ACCESS REQUESTS TO A NETWORK

(71) Applicant: Sprint Spectrum L.P., Overland Park, KS (US)

(72) Inventors: Maulik Shah, Austin, TX (US); Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 100 days.

(21) Appl. No.: 14/258,737

(22) Filed: Apr. 22, 2014

(51) Int. Cl.
*H04B 7/212* (2006.01)
*H04W 36/00* (2009.01)

(52) U.S. Cl.
CPC .................. *H04W 36/0072* (2013.01)

(58) Field of Classification Search
CPC . H04W 48/12; H04W 36/0072; H04W 72/04; H04W 72/042; H04W 72/0406; H04W 74/002; H04W 74/006; H04W 74/008
USPC ......................................................... 370/331
See application file for complete search history.

(56) References Cited

U.S. PATENT DOCUMENTS

| | | | | |
|---|---|---|---|---|
| 9,137,828 B2 * | 9/2015 | Meyer | ............... | H04W 74/0833 1/1 |
| 2009/0316653 A1 * | 12/2009 | Meyer | ............... | H04W 74/0833 370/331 |
| 2010/0105405 A1 * | 4/2010 | Vujcic | .................... | H04J 13/22 455/452.1 |
| 2010/0216483 A1 * | 8/2010 | Tynderfeldt | ......... | H04B 7/0617 455/450 |
| 2010/0285809 A1 * | 11/2010 | Lindstrom | .............. | H04L 5/001 455/450 |
| 2011/0096748 A1 * | 4/2011 | Meyer | ................. | H04W 74/006 370/329 |
| 2013/0034067 A1 * | 2/2013 | Umesh | ................ | H04W 74/002 370/329 |
| 2013/0058315 A1 * | 3/2013 | Feuersanger | ....... | H04W 52/281 370/336 |
| 2013/0195030 A1 * | 8/2013 | Wittberg | .......... | H04W 72/0446 370/329 |
| 2013/0272241 A1 * | 10/2013 | Ohta | ................... | H04W 74/002 370/329 |
| 2013/0294382 A1 * | 11/2013 | Xu | ...................... | H04W 76/066 370/329 |
| 2013/0301591 A1 * | 11/2013 | Meyer | ............... | H04W 72/1289 370/329 |
| 2014/0228013 A1 * | 8/2014 | Yang | ................. | H04W 56/0045 455/418 |
| 2014/0233528 A1 * | 8/2014 | Webb | .................... | H04W 72/04 370/330 |
| 2014/0301330 A1 * | 10/2014 | Lee | ................... | H04W 74/0833 370/329 |
| 2014/0334448 A1 * | 11/2014 | Langereis | ............. | H04W 28/18 370/331 |
| 2015/0181406 A1 * | 6/2015 | Seo | ....................... | H04W 48/12 370/329 |

* cited by examiner

*Primary Examiner* — Chi H Pham
*Assistant Examiner* — Robert Lopata

(57) ABSTRACT

A system and method for reuse of identifiers for contention-free random access requests by wireless communication devices (WCDs) to a network are disclosed. A base station can configure two or more air-interface resources for concurrent, non-interfering transmissions by two or more different WCDs of identical random access requests to the base station. The base station may then assign an identical identifier for contention-free random access requests to two or more WCDs, while assigning the WCDs different ones of the two or more air-interface resources configured for the concurrent, non-interfering transmissions. The two or more WCDs can then concurrently transmit identical contention-free random access requests that do not interfere with one another. By way of example, the air-interface resources can be different instances of a physical random access channel, each instance corresponding to a different resource block of a common uplink subframe in a long-term evolution (LTE) system.

20 Claims, 8 Drawing Sheets

REUSE OF IDENTIFIERS FOR CONTENTION-FREE RANDOM ACCESS REQUESTS TO A NETWORK

BACKGROUND

In a typical cellular radio communication system (wireless communication system), an area is divided geographically into a number of cell sites, each defined by a radio frequency (RF) radiation pattern from a respective antenna or antenna system. The antennas in the cells are in turn coupled to one or another form of controller, which is then coupled to a telecommunications switch or gateway, such as a mobile switching center (MSC) and/or a packet data serving node (PDSN) for instance. These (and possibly other) elements function collectively to form a Radio Access Network (RAN) of the wireless communication system. The switch or gateway may then be coupled with a transport network, such as the PSTN or a packet-switched network (e.g., the Internet).

Depending on the specific underlying technologies and architecture of a given wireless communication system, the RAN elements may take different forms. In a code division multiple access (CDMA) system configured to operate according to IS-2000 and IS-856 standards, for example, the antenna system is referred to as a base transceiver system (BTS), and is usually under the control of a base station controller (BSC). In a universal mobile telecommunications system (UMTS) configured to operate according to ITU IMT-2000 standards, the antenna system is usually referred to as a NodeB, and is usually under the control of a radio network controller (RNC). In a UMTS network configured to operate to Long Term Evolution (LTE) standards, evolved NodeBs (eNodeBs) may communicate directly with one another, while under functional coordination of a mobility management entity (MME). Other architectures and operational configurations of a RAN are possible as well.

A subscriber (or user) in a service provider's wireless communication system accesses the system for communication services via a Wireless Communication Device ("WCD"), such as a cellular telephone, "smart" phone, pager, or appropriately equipped portable computer, for instance. In a CDMA system a WCD is referred to as an access terminal ("AT"); in a UMTS system (including LTE) a WCD is referred to as User Equipment ("UE"). For purposes of the discussion herein, the term WCD will generally be used to refer to either an AT or UE or the like. When a WCD is positioned in a cell, it communicates via an RF air interface with the BTS, NodeB, or eNodeB antenna of the cell. Consequently, a communication path or "channel" is established between the WCD and the transport network, via the air interface, the BTS, NodeB or eNodeB, the BSC or RNC, and the switch or gateway.

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, NodeB or eNodeB, or by respective antennas. These sectors can be referred to as "physical sectors," since they are physical areas of a cell site. Therefore, at any given instant, a WCD in a wireless network will typically be positioned in a given physical sector and will be able to communicate with the transport network via the BTS, NodeB or eNodeB serving that physical sector.

The functional combination of a BTS of a cell or sector with a BSC, or of a NodeB and an RNC, or an eNodeB is commonly referred to as a "base station." The actual physical of a configuration of a base station can range from an integrated BTS-BSC or NodeB-RNC unit to a distributed deployment of multiple BTSs under a single BSC, multiple NodeBs under a single RNC, or just an eNodeB. Regardless of whether it is configured to support one cell, multiple cells, or multiple sectors, a base station is typically deployed to provide coverage over a geographical area on a scale of a few to several square miles and for tens to hundreds to several thousands (or more) of subscribers at any one time.

A subscriber may move between neighboring coverage areas of base stations. More specifically, as a subscriber at a WCD moves between wireless coverage areas of a wireless communication system, such as between cells or sectors, or when network conditions change or for other reasons, the WCD may "hand off" or "handover" from operating in one coverage area to operating in another coverage area. In a usual case, this handoff process is triggered by the WCD monitoring the signal strength of various nearby available coverage areas, and the BSC or RNC (or other controlling network entity) determining when one or more threshold criteria are met. For instance, a WCD may continuously monitor signal strength from various available sectors and notify a BSC when a given sector has a signal strength that is sufficiently higher than the sector in which the WCD is currently operating. The BSC may then direct the WCD to hand off to that other sector. By convention, a WCD is said to handoff from a "source" cell or sector (or base station) to a "target" cell or sector (or base station).

In some wireless communication systems or markets, a wireless service provider may implement more than one type of air interface protocol. For example, a carrier may support one or another version of CDMA, such as EIA/TIA/IS-2000 Rel. 0, A, and CDMA 2000 Spread Spectrum Systems Revision E (collectively referred to generally herein as "IS-2000") for both circuit-cellular voice and data traffic, as well as a more exclusively packet-data-oriented protocol such as EIA/TIA/IS-856 Rel. 0, A, or other version thereof (hereafter "IS-856"). Under IS-2000, packet-data communications may be referred to as 1X Radio Transmission Technology ("1X-RTT") communications, also abbreviated as just "1X." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as Evolution-Data Optimized ("EVDO") communications, also abbreviated as just "DO." A carrier could also implement an orthogonal frequency division multiple access (OFDMA) based system according to protocols specified by third generation partnership project (3GPP) LTE Advanced, for example. WCDs may be capable of communication under any or all such protocols, and may further be capable of handing off between them, in addition to being able to hand off between various configurations of coverage areas.

OVERVIEW

Communications from a base station (or other form of access node) to a WCD are carried on a "forward link" (in a CDMA system) or "downlink" (in a UMTS/LTE network) of an air interface between the WCD and base station, and communications from a WCD to the base station are carried on "reverse link" (in a CDMA system) or "uplink" (in a UMTS/LTE network) of the air interface. By way of example, the discussion herein will be made with reference to LTE, and the terms downlink and uplink will therefore be adopted. However, it should be understood that discussion applies as well to forward and reverse links.

While communications are generally scheduled by the base station, initiation of communication from a WCD to a base station can involve at least one unscheduled transmission from the WCD to the base station. In accordance with the air interface protocol, the base stations may provide for a shared access channel on which unscheduled messages can be sent from WCDs to the base station, for example to request access to the network for further communications. Such requests are said to be "random" in the sense they generally occur on a random basis with respect to scheduled transmissions. Once such an initial unscheduled transmission is received, the base station can then allocate initial uplink and/or downlink resources to communicate with the WCD as necessary to manage further communications. In particular, the WCD may use the initial uplink resources to send information regarding the quantity of network resources sought by the WCD. Such a communication from the WCD is referred to as a service request. The base station can then allocate sufficient network resources to accommodate the service request and send an indication of the allocation to the WCD.

Considering again the example of LTE, an eNodeB can provide a random access channel on its uplink to accommodate requests for network access made on a random basis by WCDs. More specifically, the eNodeB can inform WCDs of the random access channel and of a finite pool of unique identifiers that can be used for making random access requests. When a WCD wants to make a random access request it can select one of the identifiers and transmit it to the eNodeB on the random access channel. Because there is no guarantee that two or more WCDs won't select the same identifier when making concurrent random access requests, it can happen that the two or more concurrent, identical requests will "collide." This circumstance is generally referred to as "contention," and the procedure of using a finite pool of identifiers for making random access requests on a shared random access channel is referred to as "contention-based random access." As discussed below, the outcome of a specific instance of contending random access requests can depend on whether any one of them can be successfully received by the eNodeB, among other factors. However, contention-based random access can, in general, be a contributing factor in service latency or other forms of service degradation, depending on network load relative to the size of the pool of identifiers, for example.

In order to help improve the likelihood of success of certain types of random access requests for which latency and/or service degradation may be deemed undesirable, such as those made in the process of handovers between eNodeBs, an eNodeB can reserve a subset of the pool of identifiers for specific assignment to WCDs for "contention-free" random access requests. A given WCD can be guaranteed that an identifier assigned to it by the eNodeB, instead of one selectable at random from the pool available to other WCDs, will not be subject to contention. At the same time, however, the reserved subset of contention-free identifiers reduces the number of contention-based identifiers available, since both types of identifiers come from the same pool. Consequently, accommodation of contention-free random access requests in this manner can tend to increase instances of contention among WCDs that engage in contention-based random access. It would therefore be desirable to accommodate contention-free random access requests efficiently, without necessarily degrading contention-based random access.

Accordingly, example embodiments described herein provide systems and methods for reuse of identifiers for contention-free random access requests by WCDs. More particularly, the random access channel can be configured to use a multiplicity of air-interface resources capable of supporting concurrent, non-interfering, identical transmissions on an uplink from multiple WCDs to an eNodeB. Specifically, two or more WCDs can transmit identical random access requests at the same time on a random access channel, provided they use different air-interface resources configured for concurrent transmission on the uplink, in accordance with example embodiments.

Taking once more the example of LTE, uplink transmissions are carried in one or more resource blocks (RBs) scheduled among uplink subframes within one or more transmission frames. The random access channel can be implemented as multiple instances of random access channel, each using a different uplink RB. Because any two or more different resource blocks within a common uplink subframe can carry identical data concurrently without interfering with one another, using different RBs to configure two or more instances of the random access channel within the same uplink subframe makes it possible to use the same contention-free identifier for two or more identical contention-free random access requests by two or more different WCDs at the same time. Doing so effectively introduces a reuse capacity of contention-free identifiers, thereby both increasing the efficiency of contention-free random access requests, and increasing the number of contention-based identifiers that can remain in the pool.

Hence, in one respect, various embodiments of the present invention provide a method implemented by a base station of a wireless communication system, the method comprising: configuring a first air-interface resource and a second air-interface resource for concurrent, non-interfering transmissions by two different wireless communication devices (WCDs) of identical random access requests to the base station; transmitting a first message to a first WCD, the first message containing a particular identifier for use in a first contention-free random access request to the base station, the first message further indicating to the first WCD the first air-interface resource for use by the first WCD in transmission of the first contention-free random access request; and transmitting a second message to a second WCD, the second message containing the particular identifier for use in a second contention-free random access request to the base station, the second message further indicating to the second WCD the second air-interface resource for use by the second WCD in transmission of the second contention-free random access request wherein the first contention-free access request and the second contention-free access request are each identified only by the particular identifier.

In another respect, various embodiments of the present invention provide a base station configured for operating in a wireless communication system, the base station comprising: one or more processors; memory accessible by the one or more processors; and machine-readable instructions stored in the memory, that upon execution by the one or more processors cause the base station to carry out functions including: configuring a first air-interface resource and a second air-interface resource for concurrent, non-interfering transmissions by two different wireless communication devices (WCDs) of identical random access requests to the base station, transmitting a first message to a first WCD, wherein the first message contains a particular identifier for use in a first contention-free random access request to the base station, and the first message further indicates to the first WCD the first air-interface resource for use by the first WCD in transmission of the first contention-free random access request, and transmitting a second message to a second WCD, wherein the second message contains the particular identifier for use in a second contention-free random access request to the base station, and the second message further indicates to the second WCD the second air-interface resource for use by the second WCD in transmission of the second contention-free random access request, wherein the first contention-free access request and the second contention-free access request are each identified only by the particular identifier.

In still another respect, various embodiments of the present invention provide a non-transitory computer-readable medium having instructions stored thereon that, upon execution by one or more processors of a base station, cause the base station to carry out functions including: configuring a first air-interface resource and a second air-interface resource for concurrent, non-interfering transmissions by two different wireless communication devices (WCDs) of identical random access requests to the base station; transmitting a first message to a first WCD, wherein the first message contains a particular identifier for use in a first contention-free random access request to the base station, and the first message further indicates to the first WCD the first air-interface resource for use by the first WCD in transmission of the first contention-free random access request; and transmitting a second message to a second WCD, wherein the second message contains the particular identifier for use in a second contention-free random access request to the base station, and the second message further indicates to the second WCD the second air-interface resource for use by the second WCD in transmission of the second contention-free random access request, wherein the first contention-free access request and the second contention-free access request are each identified only by the particular identifier.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Example embodiments presented herein will be described by way of example with reference to wireless communication systems in general, and, as noted above, to LTE Advanced communication systems in particular. It will be appreciated that wireless communication systems employ a range of technologies designed to operate according to a number of related standards and protocols, including, without limitation, IS-2000, IS-856, IMT-2000, WiMax, and WiFi, among others, in order to deliver both circuit-cellular and wireless packet-data services. Underlying access technologies include CDMA, time division multiple access (TDMA), and orthogonal frequency division multiple access (OFDMA), among others.

Wireless communications systems are generally classified under the umbrella of one or another representative system architecture. One example is a "CDMA network," which, despite its label, can include both CDMA-based wireless access (e.g., as specified under IS-2000) and TDMA-based wireless access (e.g., as specified under IS-856), among other technologies. Other examples include "UMTS networks," which also can include CDMA-based wireless access (e.g., as specified under IMT-2000), and "LTE Advanced networks," which can include OFDMA-based wireless access, and are sometimes considered as next-generation variants of, and deployed within, UMTS networks. While the discussion herein focuses on embodiments in LTE Advanced networks, it should be understood that embodiments in other types wireless communication systems are possible, including, without limitation, CDMA networks and UMTS networks, and that the example of LTE Advanced should not be viewed as limiting.

Figure 1:
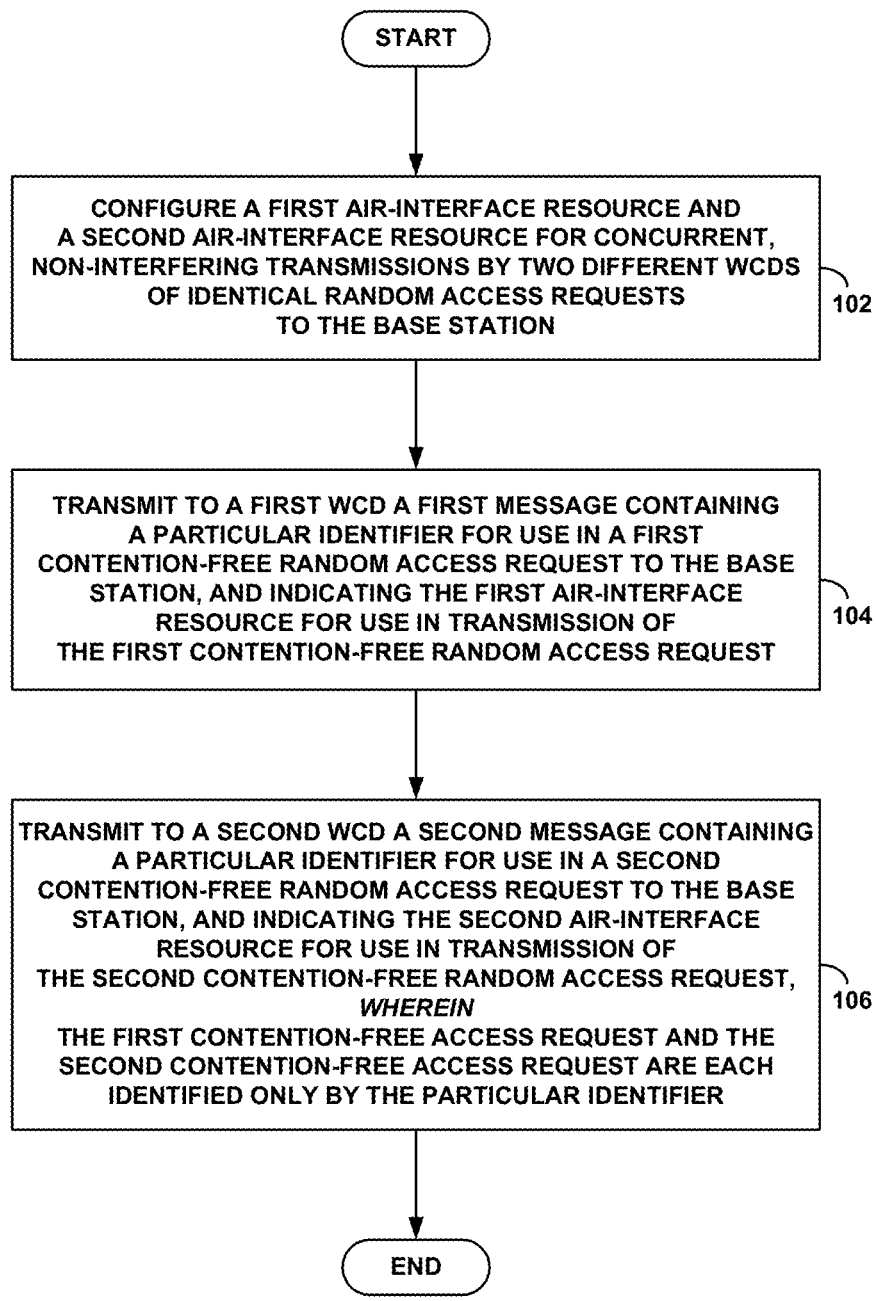
FIG. 1 is a flowchart depicting an example embodiment of a method carried out by a base station of reuse of identifiers for random access requests for network access, in accordance with example embodiments.

FIG. 1 is a flowchart depicting an example embodiment of a method in a base station of reuse of identifiers for random access requests for network access. By way of example, the steps of the flowchart could be implemented in a base station configured for operating in a wireless communication system. Also by way of example, the base station could further be an evolved NodeB (eNodeB) configured to operate under LTE Advanced.

At step 102, the base station configures a first air-interface resource and a second air-interface resource for concurrent, non-interfering transmissions by two different WCDs of identical random access requests to the base station. In accordance with example embodiments, the first air-interface resource could correspond to a given time window for transmission and a first set of radio-frequency (RF) carrier frequencies. Similarly, the second air-interface resource could correspond to the same given time window for transmission, but a second, different set of RF carrier frequencies. In particular, the first air-interface resource could correspond to a first RF domain of a random access channel, and the second air-interface resource could correspond to a second RF domain of the same random access channel.

At step 104, the base station transmits a message to a first WCD directing it to reuse an identifier for a contention-free random access request that can be concurrent with a contention-free random access request from a different WCD. More specifically, the base station transmits a first message to the first WCD, where, in accordance with example embodiments, the first message contains a particular identifier for use in a first contention-free random access request to the base station, and further indicates to the first WCD the first air-interface resource for use by the first WCD in transmission of the first contention-free random access request.

Finally, at step 106 the base station transmits a message to a second WCD, also directing it to reuse the same identifier for a contention-free random access request that can be concurrent with a contention-free random access request from a different WCD. More specifically, the base station transmits a second message to the second WCD, where, in accordance with example embodiments, the second message contains the same particular identifier for use in a second contention-free random access request to the base station, and further indicates to the second WCD the second air-interface resource for use by the second WCD in transmission of the second contention-free random access request.

In accordance with example embodiments, the first contention-free access request and the second contention-free access request are each identified only by the particular identifier. Thus, both the first and second WCDs can currently transmit identical random access requests to the base station. By respectively transmitting on the first and second air-interface resources, the concurrent, identical random access requests can be non-interfering. More particularly, by configuring the first and second sets of RF carrier frequencies to be orthogonal, the concurrent transmissions can be a Fourier superposition of carrier signals. The orthogonality property allows the received signal to be decomposed into its constituent components, thereby enabling recovery of the identical random access requests, and association of each with its respective set of RF carrier frequencies.

In further accordance with example embodiments, after transmitting the first and second messages to the first and second WCDs, respectively, the base station could concurrently receive the first and second contention-free random access requests from the first and second WCDs. The base station can then distinguish between the first and second contention-free random access requests based on a difference between the first air-interface resource and the second air-interface resource. For example, the different sets of RF carrier frequencies associated with each of the first and second WCDs could be used to distinguish two concurrent instances of the otherwise identical random access requests. Similarly, by associating the first and second WCDs with different RF domains of the random access, the base station could again distinguish the two concurrent instances of the otherwise identical random access requests.

In further accordance with example embodiments, after receiving and distinguishing between the first and second identical random access requests, the base station can then transmit responses to each. Thus, the base station could transmit a first response to the first WCD, and could transmit a second response to the second WCD. Each transmitted response could correspond to next phases in setup of the requested network access made by the two WCDs.

In accordance with example embodiments, the base station could transmit the first message via a first intermediate base station, and could transmit the second message via a second intermediate base station. The first and second intermediate base stations could be the same or could be different. More particularly, under LTE, when a WCD (e.g., a UE) hands off from a source eNodeB to a target eNodeB, the target base station can provide the UE with a contention-free identifier and inform the UE of a random access channel to use for contention-free random access requests. The target eNodeB can provide the information in a message sent to the UE by way of the source eNodeB that is currently serving the UE. Thus, in accordance with example embodiments, a first source eNodeB could correspond to a first intermediate base station serving a first UE, and a second source eNodeB could correspond to a second intermediate base station serving a second UE. The target eNodeB can transmit the first message to the first UE via the first source eNodeB, and transmit the second message to the second UE via the second source eNodeB. As discussed below, the first and second messages can specify first and second instances of the random access channel that can provide for concurrent, non-interfering transmission by the UEs of identical random access requests. If the first and second UEs are being served by the same source eNodeB, then the first and second intermediate eNodeBs would be the same; otherwise they could be different.

In accordance with example embodiments, the base station can maintain a pool of distinct identifiers for use by WCDs in random access requests. In particular, the pool of distinct identifiers can include a first number of identifiers that are selectable at random by WCDs for contention-based random access requests. Contention-based random access requests (and their associated identifiers) are one that do not guarantee against contending random access requests due to concurrent selection of a common identifier by multiple WCDs. The pool of distinct identifiers can also include a second number of identifiers, including the particular identifier, reserved for assignment by the base station to WCDs for contention-free random access requests. Thus, transmitting the first message to the first WCD can correspond to assigning both the particular identifier and the first air-interface resource to the first WCD. Similarly, transmitting the second message to the second WCD can correspond to assigning both the particular identifier and the second air-interface resource to the second WCD.

In further accordance with example embodiments, the first and second air-interface resources can be two of $N \geq 2$ air-interface resources that support concurrent, non-interfering transmissions by N different WCDs of identical random access requests to the base station. That is, there can be two or more air-interface resources configured for concurrent, non-interfering transmissions of identical random access requests. The relative size of the first and second numbers of identifiers can be determined based at least in part on N. More specifically, N is an indication of a reuse multiplicity factor for contention-free random access requests. For example, N=2 supports two concurrent, contention-free identifier transmissions; N=3 supports two concurrent, contention-free identifier transmissions, and so on. As the reuse multiplicity factor increases, the number of contention-free identifiers needed to achieve a given rate of contention-free random access requests decreases, and, correspondingly, the number of identifiers that can remain in the first subset (i.e., contention-based identifiers) for the given rate can increase. Other factors can be applied to determine the relative numbers for contention-free and contention-based identifiers, as well.

Thus, in further accordance with example embodiments, the base station can configure a third air-interface resource for an additional concurrent, non-interfering transmission by a WCD of the identical random access request to the base station. In addition to transmitting the first and second messages to the first and second WCDs, the base station can then also transmit a third message to a third WCD. The third message can contain the particular identifier for use in a third contention-free random access request to the base station, and further indicate to the third WCD the third air-interface resource for use by the third WCD in transmission of the third contention-free random access request. As with the first and second contention-free random access requests, the third contention-free access request can also be identified only by the particular identifier.

As discussed above, the wireless communication system could, by way of example, be configured to operate according to at least Long Term Evolution (LTE), the base station can be an eNodeB, and WCDs can be UEs. In an LTE system, transmissions from the eNodeB to UEs are carried on downlinks comprising downlink resource blocks (RBs) in downlink subframes, and transmissions from UEs to the eNodeB are carried on uplinks comprising uplink RBs in uplink subframes. Also, under LTE, random access requests are transmitted by UEs on a physical random access channel (PRACH) implemented in one or more PRACH instances, where each PRACH instance uses a different uplink RB in a given uplink subframe. Further, the identifiers of random access requests are referred to as "preambles." Thus, following from the discussion above, the eNodeB maintains a pool of distinct preambles for use by UEs in random access requests. More particularly, the pool of distinct preambles includes a first number of contention-based preambles selectable at random by UEs for contention-based random access requests, and a second number of contention-free preambles reserved for assignment by the eNodeB to UEs for contention-free random access requests.

The, in accordance with example embodiments in which the wireless communication system is configured to operate according to at least Long Term Evolution (LTE), transmitting the first message to the first WCD could entail assigning both a particular preamble and a first PRACH instance of a particular uplink subframe to a first UE. Similarly, transmitting the second message to the second WCD could entail assigning both the particular preamble and a second, different PRACH instance of the particular uplink subframe to a second UE.

Figure 2:
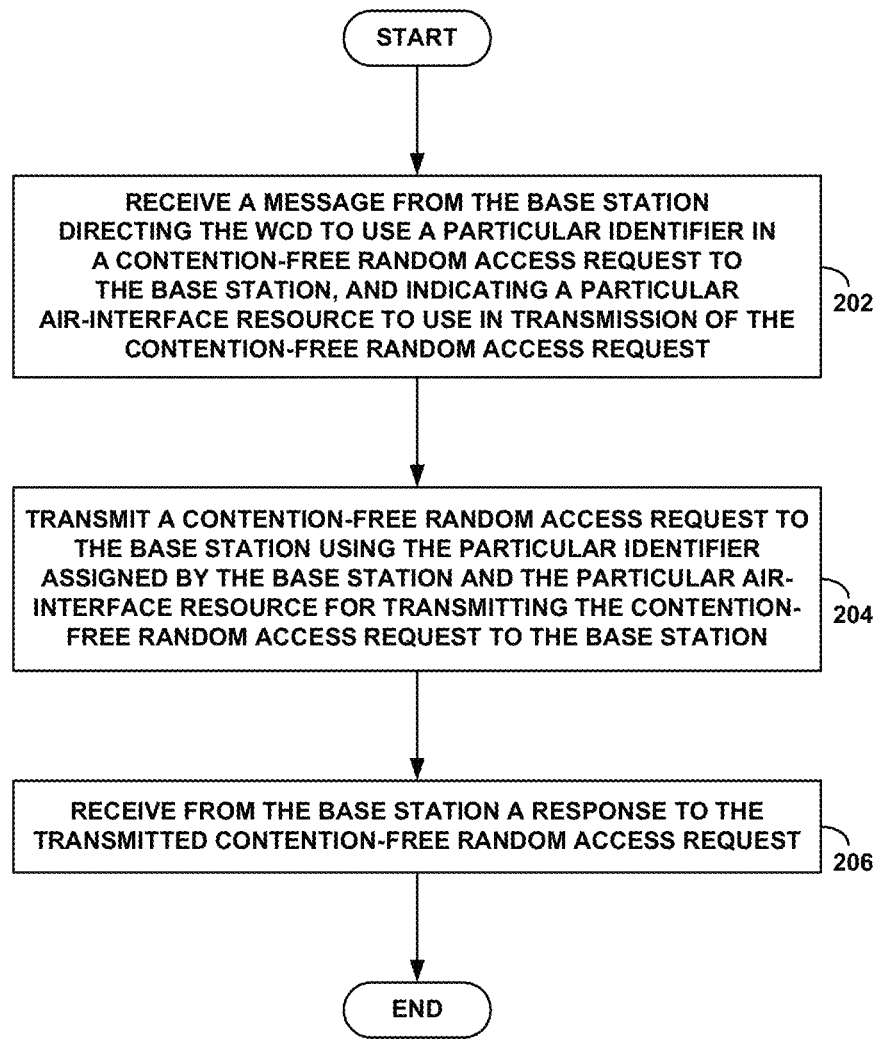
FIG. 2 is a flowchart depicting an example embodiment of a method carried out by a wireless communication device of reuse of identifiers for random access requests for network access, in accordance with example embodiments.

While the method illustrated in FIG. 1 is carried out by a base station (e.g., an eNodeB), reuse of identifiers for random access requests for network access can also involve actions carried out by WCDs (e.g., UEs) as well. FIG. 2 is a flowchart depicting an example embodiment of a method in a wireless communication device (WCD) of reuse of identifiers for random access requests for network access. By way of example, the steps of the flowchart could be implemented in a WCD for operating in a wireless communication system. Also by way of example, the WCD could further be a UE configured to operate under LTE Advanced.

At step 202, the WCD receives a message from the base station directing the WCD to use a particular identifier in a contention-free random access request to the base station, and further indicating to the WCD a particular air-interface resource to use by the WCD in transmission of the contention-free random access request. In accordance with example embodiments, the particular air-interface resource is one of at least two air interface resources that are configured to support concurrent, non-interfering transmissions of identical contention-free random access request by two or more different WCDs to the base station.

At step 204, the WCD transmits a contention-free random access request to the base station. In accordance with example embodiments, the contention-free random access request is identified only by the particular identifier assigned by the base station in the message transmitted at step 202, and the WCD uses the particular air-interface resource for transmitting the contention-free random access request to the base station.

Finally, at step 206 the WCD receives from the base station a response to the transmitted contention-free random access request. In accordance with example embodiments, the response can be an acknowledgement of the WCD's transmitted contention-free random access request, and serve as a next phase providing the WCD with the requested network access.

It will be appreciated that the example embodiments illustrated in FIGS. 1 and 2 could include alternate and/or additional steps, while still remaining within the scope and spirit of example embodiments herein.

Figure 3:
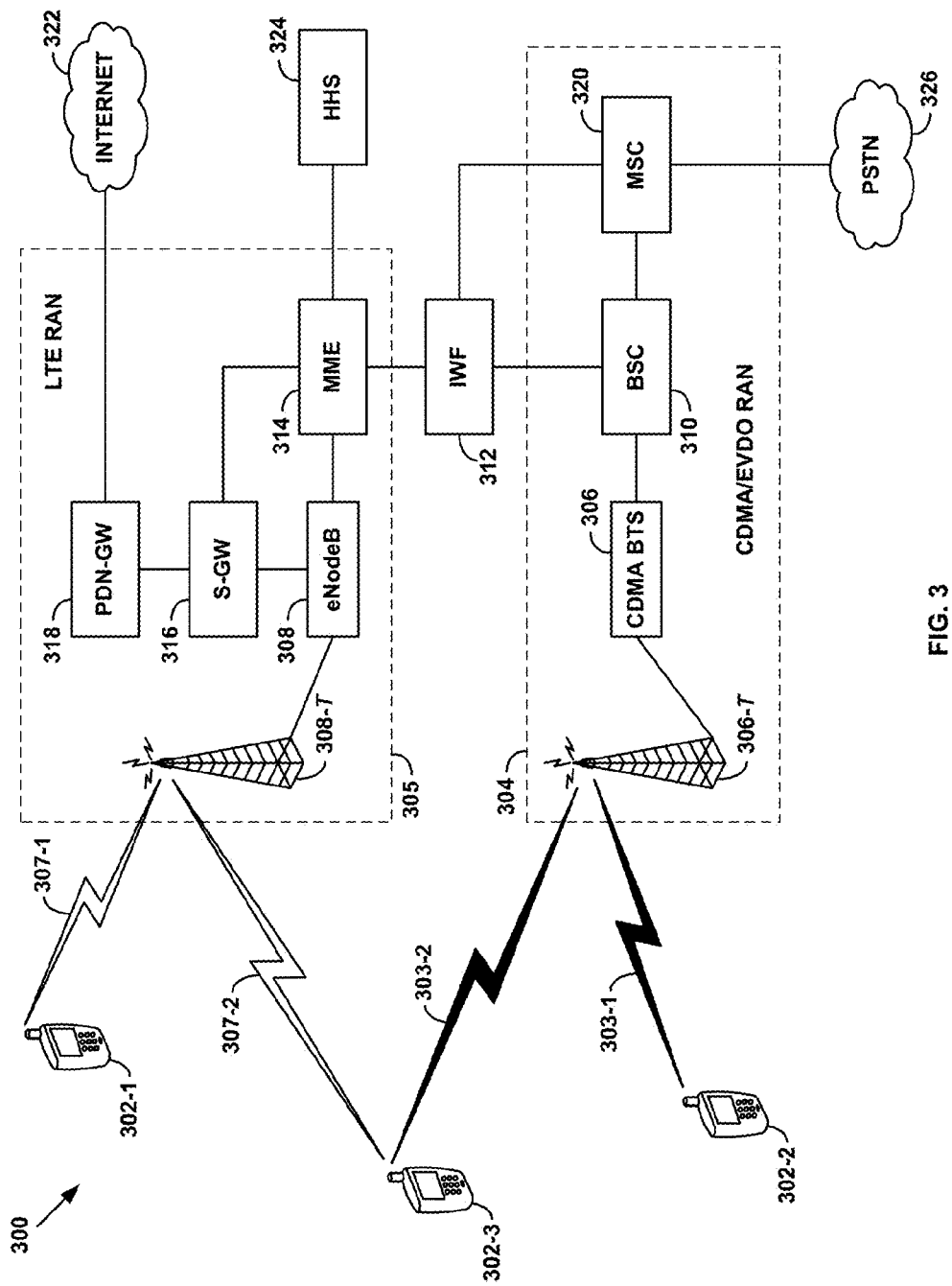
FIG. 3 is a simplified block diagram of a wireless communication system in which reuse of identifiers for random access requests for network access could be implemented, in accordance with example embodiments.

FIG. 3 shows a simplified block diagram of a wireless network 300 that can be operated by a wireless service provider, and in which an example method of reuse of identifiers for random access requests for network access can be carried out. By way of example, the network 300 includes RAN 304 configured to support both CDMA-based air interface communications (e.g., as specified under both IS-2000 and IS-856), RAN 305 configured to support OFDMA-based air interface communications (e.g., as specified under LTE Advanced). For convenience in discussing the example embodiments presented herein, the term "EVDO RAN" will be used for referring to the RAN 304, and the term "LTE RAN" will be used for referring to the RAN 305. It will be appreciated that a network such as network 300 could include support for other types of air-interface technologies as well.

The EVDO RAN 304 includes a CDMA BTS 306 with a CDMA/EVDO air interface antenna 306-T for providing services according to CDMA/EVDO. The LTE RAN 305 includes an LTE eNodeB 300 with an LTE air interface antenna 308-T for providing services according to LTE.

The example illustrated in FIG. 3 also shows three WCDs 302-1, 302-2, and 302-3, each depicted as having at least one active air interface of a particular type with one or another of the antennas 306-T or 308-T. Specifically, the WCD 302-1 has an air interface 301-1 with the LTE RAN 305 via the eNodeB 308 and the associated antenna 308-T. The WCD 302-2 has an air interface 303-1 also with the EVDO RAN 304 via the BTS 306 and the associated antenna 306-T. The WCD 302-2 has two different air interfaces: an air interface 303-2 with the EVDO RAN 304 via the BTS 306 and the associated antenna 306-T, and an air interface 307-2 with the LTE RAN 305 via the eNodeB 308 and the associated antenna 308-T.

As a visual cue of that the air interfaces are different types, the LTE air interfaces are depicted as white-filled "lightning bolts," and the EVDO air interfaces are depicted as blackened "lightning bolts." The two air interfaces 307-2 and 303-2 depicted for the WCD 302-3 may be taken as representing a capability of the WCD 302-3 to operate according to either air interface separately, and/or to operate according to both concurrently.

For communications under LTE (or LTE Advanced) based protocols, subscribers may engage in communications via the eNodeB 308 and the associated antenna 308-T from the WCD 302-1 over air interface 307-1 and/or from the WCD 302-3 over air interface 307-2. Transmissions over the air interface 307-1 from the antenna 308-T to the WCD 302-1 represent a downlink from the eNodeB 308 to the WCD 302-1, while transmissions over air interface 307-1 from the WCD 302-1 to the antenna 308-T represent an uplink from the WCD 302-1. Similarly, transmissions over the air interface 307-2 from the antenna 308-T to the WCD 302-3 represent a downlink from the eNodeB 308 to the WCD 302-3, while transmissions over air interface 307-2 from the WCD 302-3 to the antenna 308-T represent an uplink from the WCD 302-3. Under LTE Advanced, the downlink operates according to OFDMA, while the uplink operates according to Single Carrier Frequency Division Multiple Access (SC-FDMA).

The eNodeB 308 may be connected to a serving gateway S-GW 316, which in turn may be connected to an internet 322 via a packet data network gateway PDN-GW 318. The eNodeB 308 could also be connected to the S-GW 316 by way of a mobility management entity MME 314, which may also be configured to control communications between the eNodeB 308 and one or more other eNodeBs in the network. The MME 314 may also be communicatively coupled to a home subscriber server (HSS) 324, which stores subscriber information, including information about the WCD 302-1 and/or WCD 302-3. For cellular voice communications, the eNodeB may connect to a MSC 320 by way of an interworking function IWF 312 communicatively connected between the MME 312 and the MSC 320. The MSC 320 may then provide connectivity of a PSTN 326, as shown.

For communications under CDMA based protocols, subscribers may engage in communications via the BTS 306 and the associated antenna 306-T from the WCD 302-2 over air interface 303-1 and/or from the WCD 302-3 over air interface 303-2. Transmissions over the air interface 303-1 from the antenna 306-T to the WCD 302-2 represent a forward link from the CDMA/EVDO BTS 306 to the WCD 302-2, while transmissions over air interface 303-1 from the WCD 302-2 to the antenna 306-T represent a reverse link from the WCD 302-2. Similarly, transmissions over the air interface 303-2 from the antenna 306-T to the WCD 302-3 represent a forward link, while transmissions over air interface 303-2 from the WCD 302-3 to the 306-T represent a reverse link.

The CDMA BTS 306 may be connected to a BSC 310, which provides a connection to the MSC 320 for cellular voice communications. The MSC 320 acts to control assignment of air traffic channels (e.g., over air interfaces 303-1 and 303-2), and provides access to wireless circuit-switched services such as circuit-voice and circuit-data (e.g., modem-based packet data) service. As represented by its connection to the PSTN 326, the MSC 320 may also be coupled with one or more other MSCs, other telephony circuit switches in the operator's (or in a different operator's) network, or other wireless communication systems, thereby supporting user mobility across MSC regions, roaming between systems, and local and long-distance landline telephone services.

For packet data communications, the IWF 312 connected between the BSC 310 and the MME 314 can support interworking between EVDO based packet protocols and those of the LTE Advanced based network. Thus, the BSC 310 may communicate on the internet 322 by way of the MME 314, the S-GW 316, and the PDN GW 318.

It should be understood that the depiction of just one or two of each network element in FIG. 3 is illustrative, and there could be more of any of them, as well as other types of elements not shown. The particular arrangements shown in FIG. 3 should not be viewed as limiting with respect to the example embodiments presented herein. Further, the network components that make up a wireless communication system such as network 300 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs (or other forms of computer logic instructions) and related data (e.g., machine-language instructions and program and user data) stored in the one or more forms of computer-readable storage and executable by the one or more computer processors to carry out the functions, steps, and procedures of the various example embodiments described herein. Similarly, a communication device, such as example WCDs 302-1, 302-2, and 302-3, typically comprises a user-interface, I/O components, a communication interface, a tone detector, a processing unit, and data storage, all of which may be coupled together by a system bus or other mechanism. As such, network 300, WCDs 302-1, 302-2, and 302-3, and air interfaces 303-1, 303-2, and 307-1, and 307-2 collectively are representative of example means of implementing and carrying out the various functions, steps, and procedures described herein.

1. Example Access Technologies a. CDMA Communications

In a conventional CDMA wireless network compliant with the well-known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When a WCD operates in a given sector, communications between the WCD and the BTS of the sector are carried on a given frequency and are encoded by the sector's PN offset and a given Walsh code. The power allocated to each channel is determined so as to optimize the signal to noise characteristics of all the channels, and may vary with time according to the number of WCDs being serviced, and their relative positions with respect to the BTS, among other factors.

Air interface communications are divided into forward link communications, which are those passing from the base station to the WCD, and reverse link communications, which are those passing from the WCD to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of WCDs between sectors, under IS-2000 a WCD can communicate on a given carrier frequency with a number of "active" sectors concurrently, which collectively make up the WCD's "active set." Depending on the system, the number of active sectors can be up to six (currently). The WCD receives largely the same signal from each of its active sectors and, on a frame-by-frame basis, selects the best signal to use. A WCD's active set is maintained in the WCD's memory, each active sector being identified according to its PN offset.

The WCD continually monitors a pilot signal from each of its active sectors as well as from sectors in a "neighbor list" of other sectors generally neighboring the active sectors. The pilot signal strengths may vary as the WCD moves about within the wireless communication system, or as other factors cause the WCD's RF conditions to change. More particularly, the WCD monitors a signal-to-noise metric referred to as "signal to interference plus noise ratio" ("SINR"), which includes the degrading effects of interference as well as noise on RF conditions. The WCD reports the received signal strengths to the serving base station, which then directs the WCD to update its active set from among its current active set and, more broadly, from among its neighbor list, in accordance with the reported strengths and one or more threshold conditions. Note that a WCD's active set can include a femtocell.

Typically, the power level of the pilot detected by a WCD is specified as a gain level, x, according to the relation x dBm=10 log$_{10}$(P/1 mW), where P is the power in mW (milliwatts). However, other power units could be specified. Measured in dBm, gain expresses a logarithmic ratio of power P to a fixed power level of 1 mW. More generally, the relative gain, y, of one power level $P_1$ to another $P_2$ is expressed as dB, and corresponds to a logarithmic ratio of $P_1$ to $P_2$ given by y dB=10 log$_{10}$($P_1/P_2$). For instance, if y=3, then $P_1 \approx 2 \times P_2$; if y=−3, then $P_1 \approx 0.5 \times P_2$. In practice, SINR is measured in dB, where $P_1$ corresponds to the received power of the pilot and $P_2$ corresponds to the received noise plus interference power.

b. High Rate Packet-Data TDM Communications

Under IS-2000, the highest rate of packet-data communications theoretically available on a fundamental traffic channel of the forward link is 9.6 kbps, dependent in part on the power allocated to the forward-link traffic channel and the resultant signal to noise characteristics. In order to provide higher rate packet-data service to support higher bandwidth applications, the industry introduced a new "high rate packet data (HRPD) system," which is defined by industry standard IS-856 (or EVDO).

IS-856 leverages the asymmetric characteristics of most IP traffic, in which the forward link typically carries a higher load than the reverse link. Under IS-856, each WCD maintains and manages an active set and a neighbor list as described above, but receives forward-link transmission from only one active sector at a time. In turn, each sector transmits to all its active WCDs on a common forward link using time division multiplexing (TDM), in order to transmit to only one WCD at a time, but at the full power of the sector. As a result of the full-power allocation by the sector, a WCD operating under IS-856 can, in theory, receive packet-data at a rate of at least 38.4 kbps and up to 2.4 Mbps. The reverse link under IS-856 retains largely the traditional IS-2000 code division multiplexing (CDM) format, albeit with the addition of a data rate control (DRC) channel used by the WCD to indicate the supportable data rate and best serving sector for the forward link. More specifically, the WCD monitors SINR on the forward link from its serving sector (or base station) to determine a data rate to request. The requested data rate is encoded in a DRC request, and transmitted to the serving base station on the DRC channel, which is a sub-channel of a reverse-link Medium Access Control (MAC) channel.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a forward-link MAC channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. As in IS-2000, each sector in IS-856 is defined by a PN offset, and the pilot channel carries an indication of the sector's PN offset. Again, a sector could correspond to a femtocell.

c. LTE Advanced Communications

Under LTE Advanced, the air interface comprises multiple frequency carrier bands arranged to cover a total bandwidth in frequency space that depends on what portion or portions of the radio spectrum are licensed by the network service provider, and on which of two types of systems is deployed, which in turn may also depend on the licensed spectrum. In frequency division duplex (FDD) LTE, the uplink and down link each occupy a different block of radio spectrum, each block providing up to 20 MHz of bandwidth in frequency space. Under FDD LTE, uplink and downlink transmissions can be concurrent. In time division duplex (TDD) LTE, the uplink and downlink each occupy the same block of radio spectrum. Under TDD LTE, uplink and downlink transmissions take turns according to configuration-specific allocation of subframes within repeating radio transmission frames.

For both FDD and TDD LTE, each frequency carrier band is divided into 12 orthogonal subcarrier frequencies, each 15 kHz in width, for a total of 180 kHz per frequency carrier band. The number of frequency carrier bands corresponds to the integer division of the total bandwidth by 180 kHz. For example, a total bandwidth of 1.25 MHz supports six frequency carrier bands; a total bandwidth of 20 MHz supports 100 frequency carrier bands. The orthogonality of the subcarrier frequencies follows from each being an integer multiple of the same minimum frequency; e.g., 15 kHz. It will be appreciated that a different minimum frequency could be used, as long as the orthogonality condition is met. Similarly, a different number of subcarrier frequencies per frequency carrier band could be used, which could then lead to a different number frequency carrier bands for a given total bandwidth.

In the time domain, both the uplink and downlink comprise time slots, each time slot typically of 0.5 msec duration. Every two time slots makes up one "subframe" of 1.0 msec duration, and every 10 subframes makes up a 10 msec frame. In FDD LTE, each subframe of a frame carries only uplink or only downlink transmission. In TDD LTE, each frame includes both uplink and downlink subframes, the relative number of and placement of each type of subframe typically being specified by defined standards and/or a system-specific configuration.

Each time slot is subdivided into an integer number of symbol durations, such that the integer number multiplied by the symbol duration equals 0.5 msec. According to current standards, the integer number is either 6 or 7; the value used depends on operating conditions, among other possible factors. For the purposes of the present discussion the integer number of symbol durations per time slot will be taken to be 7, with the understanding that other values could be used.

Transmissions are scheduled in time-frequency units referred to as "resource blocks" or RBs. Each RB is made up of 7 contiguous symbol durations (i.e., one time slot) and 12 subcarrier frequencies of a given frequency carrier band. Thus, a RB can be viewed as a grid of 7 symbol durations by 12 subcarrier frequencies. Each element of the grid is referred to as "resource element," and each resource element carries one OFDM symbol. Each OFDM symbol of a resource element is a time domain symbol generated from Fourier superposition frequency domain symbols. On given uplink or downlink, concurrent transmissions carried in different RBs are non-interfering in the sense that the subcarrier frequencies are orthogonal. Thus, while a receiving device (e.g., a UE on a downlink or an eNodeB on an uplink) will receive a superposition signal, the orthogonality property allows recovery by Fourier decomposition of the symbols in the frequency domain.

A single RB is the smallest unit of allocation made for a given WCD for downlink transmissions. Allocations are typically made by an eNodeB serving the WCD, and more than one RB can be allocated for the WCD. Multiple RB allocations for a given WCD can be made across multiple frequency carrier bands, across multiple time slots, or both, depending on factors including the amount of data to be transmitted to the WCD, the type of data (e.g., best-effort, real-time, etc.), and downlink resources needed for other WCDs.

In addition to carrying OFDM symbols specific to a given WCD, particular resource elements of a given RB are allocated as "reference signals," and may be used to carry pilot signals from the eNodeB. Upon detection of a pilot signal in one or more resource elements of an RB, a WCD may determine SINR of the eNodeB (or more generally, the LTE Advanced base station) that made the RB-based transmission. The WCD may then use the SINR (or other SNR measure) of different eNodeBs that it detects to determine if and when to hand off from one to another, for example. Specific RBs of the downlink can also be configured as channels for carrying system messages and/or other overhead data. In addition, specific RBs of the uplink can be configured to support a random access procedure by which WCDs can request network access on a random basis. This is discussed in more detail below.

Under LTE, the network provides the WCD with neighbor lists that identifies neighboring eNodeBs that may be suitable candidates for service for the WCD. The WCD can measure signal quality of those eNodeBs in the neighbor list that it can detect, and report the measurements back to the network. The network can then decide if a handover (as handoff is referred to under LTE) is warranted.

2. Reuse of Identifiers for Random Access Requests

As discussed briefly above, downlink communications in wireless communication system, such as network 300, are generally scheduled by a base station, while communications on the uplink can involve at least one unscheduled transmission from the WCD to a base station. In particular, base stations may provide for a shared access channel on which random access requests can be sent from WCDs to the base station. Additionally, a shared access channel can be configured to support procedures for contention-based random access, contention-free random access, or both. Once a random access request is received, the base station can then allocate initial uplink and/or downlink resources to communicate with the WCD as necessary to manage further communications.

For purposes of illustration, and by way of example, the random access procedure can be described in connection with operations and procedures in accordance with LTE Advanced. Initially, an eNodeB broadcasts system information that specifies its random access channel, referred to in LTE as a "physical random access channel" ("PRACH"). For example, the system information may specify time-frequency windows (e.g., RBs) designated for unscheduled transmissions on its PRACH, as well as other network information (e.g., network capabilities, synchronization information, etc.). The unscheduled transmissions made by UEs—e.g., random access requests—can each include an identifier for differentiating transmissions received in the same time-frequency window. In accordance with LTE, identifiers for random access requests are referred to as "RA radio network temporary identifiers" ("RA-RNTIs"), or sometimes just called "RACH preambles" or "RACH preamble codes." A given eNodeB can have finite set or list of different RA-RNTIs (e.g., 64 different values), and can include the list in its broadcast the system information.

In contention-based random access, UEs in the coverage area of an eNodeB can detect the system information broadcast, randomly select a RA-RNTI from the list provided by the eNodeB, and send a message using the selected preamble code to the eNodeB over the PRACH. The preamble codes are configured such that the eNodeB is able to use code differentiation (e.g., code division multiplexing) to resolve concurrently received preamble messages with different preamble codes.

When the eNodeB receives and successfully decodes the preamble code, it responds by sending a random access response (RAR) during a response window that is based on the time-frequency window used to send the initial preamble code. As a result, all UEs that sent respective preamble codes during a given time-frequency window monitor the same response window. A given RAR may therefore include data addressed to each of the preamble codes received in the preceding PRACH time-frequency window. For example, the RAR may include indicators for each of the preamble codes the eNodeB received, and the UE(s) that used those codes for their random access messages then use the indicators to identify the data addressed to them. If a given UE does not identify an indicator corresponding to the preamble code used by that UE (such as may occur if the preamble code could not be decoded by the eNodeB due to interference or otherwise), the UE can restart the random access procedure by selecting a new preamble code and transmitting another preamble message over the PRACH.

For a UE that does identify an indicator corresponding to their selected preamble code in the RAR, the data addressed to the UE may include an assignment of initial control channel uplink and downlink resources to allow the UE to exchange further information with the eNodeB. In addition, the RAR can assign a "temporary cell radio network temporary identifier" ("C-RNTI") to identify the UE in subsequent communications, and can also indicate a timing offset for the UE to use to account for propagation delays to the eNodeB or to otherwise synchronize uplink communications.

The UE uses the uplink resources assigned in the RAR and sends the eNodeB a connection request. Among other information, the connection request may include a unique identifier for the UE (e.g., a temporary mobile subscriber identity (TMSI), a previously assigned C-RNTI, a random number, or another unique identifier). The UE then monitors the downlink resource granted in the RAR for a response from the eNodeB. The eNodeB responds with a contention resolution message that includes the UE's unique identifier. Receiving a matched unique identifier in the contention resolution message provides confirmation that the UE's connection request was received by the eNodeB.

Because the set of preamble codes for a given eNodeB is finite, and because they are independently randomly selected by the UEs requesting random access from the given eNodeB, it is possible for multiple UEs to select the same preamble code for use during the same time window. When this happens, one or more random access messages can interfere with one another and result in contention, as previously noted. If one of the interfering preamble messages is stronger than the others, the eNodeB may still be able to successfully decode the message with the strongest signal despite the increased noise from the others. But if none of the interfering preamble messages are significantly stronger than the others, the eNodeB may fail to decode any of them.

The contention resolution message resolves the contention due to the possibility of multiple UEs using the same preamble code. If a UE receives a contention resolution message that does not match its unique identifier, the UE discards its temporary C-RNTI and restarts the random access procedure by selecting a new preamble code and transmitting another random access request over the PRACH. The UE that passed contention resolution (i.e., that received back its matching unique identifier) promotes its temporary C-RNTI to a full C-RNTI for use in subsequent communications with the eNodeB, and continues exchanging messages with the base station as necessary to setup a connection.

Contention-base random access can be appropriate in circumstances for which some degree of delay or latency in access is acceptable or tolerable. For example, a UE requesting a connection to send or receive email might be able to tolerate some delay in gaining network access. In other circumstances, delay or latency may not be acceptable, or may be less tolerable. For example, when a UE hands over from a source eNodeB to a target eNodeB, it typically must first request and be granted access from the target eNodeB. Delay in such a random access request can lead to a dropped call or data session, or other form of service degradation.

In order to help mitigate potential delay or latency in servicing random access requests made in these or similar circumstances, a given eNodeB can reserve one or more of its preamble codes (RA-RNTIs) for assignment to specific UEs. More particularly, by assigning a particular preamble code to only a specific UE, the eNodeB can assure that the specific UE's random access request will not be subject to contention. Thus, such random access requests are referred to as contention-free random access requests, and the preamble codes reserved for contention-free random access requests are referred to as contention-free preamble codes (or more generally, contention-free identifiers for random access requests).

Figure 4:
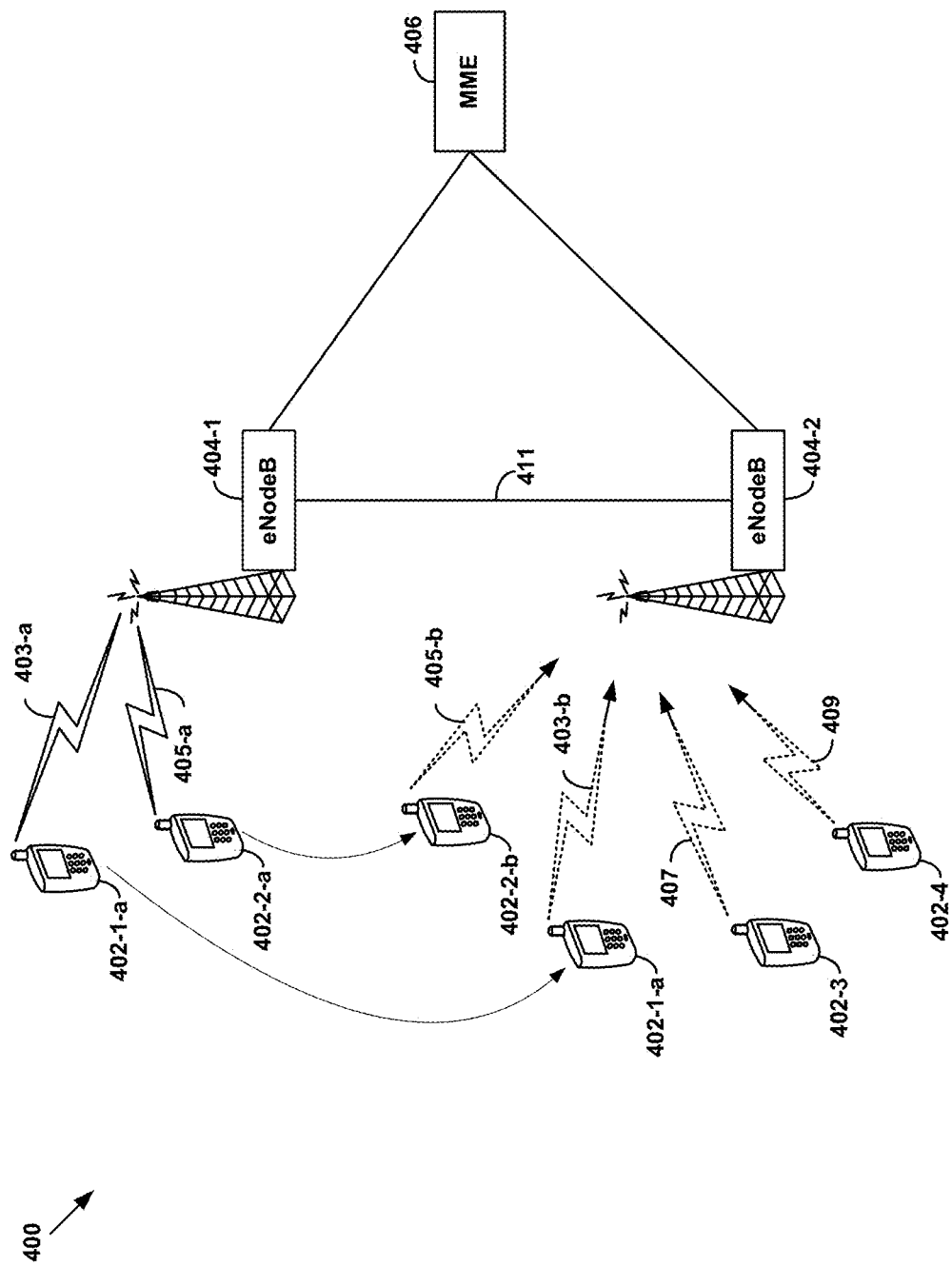
FIG. 4 is illustrates an example operational context in which reuse of identifiers for random access requests for network access can be applied, in accordance with example embodiments.

FIG. 4 is an abbreviated depiction of a radio access network 400 in which random access procedures can be carried out, in accordance with example embodiments. For purposes of illustration, and by way of example, network 400 is taken to be configured to operate according to LTE (including LTE Advanced). As shown, network 400 includes two eNodeBs, 404-1 and 404-2, each connected to a MME 406. In addition, eNodeBs 404-1 and 404-2 are communicatively connected with each other by way of an "X-2" connection 411, which can support direct eNodeB-to-eNodeB communications, in accordance with LTE Advanced protocols.

Also for purposes of illustration, and by way of example, four UEs, 402-1, 402-2, 402-3, and 402-4, are shown as operating in the network 400. To represent mobility and handover, the UE 402-1 is shown in two locations and labeled UE 402-1-*a* and UE 402-1-*b*. More particularly, UE 402-1-*a* is shown as engaging in established communications with the eNodeB 404-1 via air-interface link 403-*a*, meant to represent an uplink and a downlink. UE 402-1-*b* represents the same UE after moving to a different location, where it makes a random access request to the eNodeB 404-2 on an uplink of an air interface 403-*b*. Similarly, UE 402-2-*a* is shown as engaging in established communications with the eNodeB 404-1 via air-interface link 405-*a*, meant to represent an uplink and a downlink. UE 402-2-*b* represents the same UE after moving to a different location, where it makes a random access request to the eNodeB 404-2 on an uplink of an air interface 405-*b*. The UEs 402-3 and 402-4 are each shown in just one location, from which they are making respective random access requests on respective uplink of an air interfaces 407 and 409.

As a visual cue, the air interfaces 403-*b*, 405-*b*, 407, and 409 are represented separately with dashed lines and arrows pointing toward the eNodeB 404-2 to signify that they carry requests for access not yet granted by the eNodeB 404-2. In practice, the four designated air interfaces could be different requests on common random access channel of a common uplink air interface.

In the example operation illustrated, UEs 402-3 and 402-4 can be taken to be engaging in contention-based random access. Thus, as described above, each of these UEs will randomly select a contention-based RACH preamble code from among the set of available contention based RACH preamble codes for the eNodeB 404-2. It is therefore possible for both UE 402-3 and 402-4 to select the same RACH preamble code, and for their random access requests to collide as a result, giving rise to contention. The UEs 402-1-*b* and 402-2-*b*, on the other hand, can be taken to be engaging in contention-free random access, each using a contention-free RACH preamble code assigned to it by the eNodeB 404-2. Consequently, the random access requests from the UEs 402-1-*b* and 402-2-*b* may not be subject to contention.

Under LTE Advanced, the UEs 402-1-*b* and 402-2-*b* of the illustrated example can engage in contention-free random access because they are both handing over from a source eNodeB (i.e., the eNodeB 404-1), with which they have current active connections, to a target eNodeB (i.e., the eNodeB 404-2), with which a delayed or dropped connection is unacceptable or undesirable. In practice, when the source eNodeB 404-1 currently serving the UEs 402-1-*a* and 402-2-*a* determines that respective handovers to the target eNodeB 404-2 are necessary, the source eNodeB 404-1 sends a Handover Request Message to the target eNodeB 404-2 via the X-2 connection 411. In conventional operation of contention-free random access under LTE, the target eNodeB 404-2 can respond by assigning a different contention-free RACH preamble code to each of the UEs 402-1-*a* and 402-2-*a*, and sending the assigned contention-free RACH preamble codes to the source eNodeB 404-1 via the X-2 connection 411. The source eNodeB 404-1 can, in turn, provide the assigned contention-free RACH preamble codes to the UEs 402-1-*a* and 402-2-*a* on the downlink of the air-interfaces 403-*a* and 405-*a*. As an initial step of the handover, each of the UEs 402-1-*b* and 402-2-*b* (so designated to indicate new, pending associations with the target eNodeB 404-2) transmits its respective, assigned contention-free RACH preamble code to the target eNodeB 404-2 on the PRACH configured in the uplink of the air interfaces 403-*b* and 405-*b*. The absence of contention can help assure that the handovers will be successful. It will be appreciated that there can be other types of communication requests and/or circumstances beside handovers for which contention-free random access procedures may be appropriate or specified.

While the contention-free random access procedure can help improve the likelihood of successful and timely network access for UEs engaging in communications that may require low latency, the reservation of a subset of the eNodeB's finite set of RACH preamble codes for contention-free random access reduces the number of these codes available for contention-based random access. Depending on the eNodeB's servicing load (e.g., number of UEs requesting access during a given time), a reduced number of contention-based RACH preamble codes can be a factor in service degradation for UEs engaging in contention-based random access. Furthermore, the degree to which contention-free random access achieves its goal can depend on the number of contention-free RACH preamble codes reserved for contention-free random access, as well as on the number or UEs requiring contention-free random access.

In accordance with example embodiments, the uplink to a base station (e.g., eNodeB 404-2) can be configured with two or more air-interface resources in such a way that supports two or more identical transmissions made concurrently by different WCDs. More particularly, a random access channel of an uplink can be configured to carry multiple transmissions of the identical, contention-free preamble code from multiple, different WCDs at the same time, in such a way that a receiving base station can successfully decode the multiple transmissions, and associate each with the WCD that sent it. In this sense, a contention-free preamble code can be reused concurrently among the multiple, different WCDs. Reuse of contention-free preamble codes in this manner can therefore increase the efficiency and success rate of contention-free random access requests, and at the same time increase the number of contention-based preamble codes available for contention-based random access requests.

Figure 5:
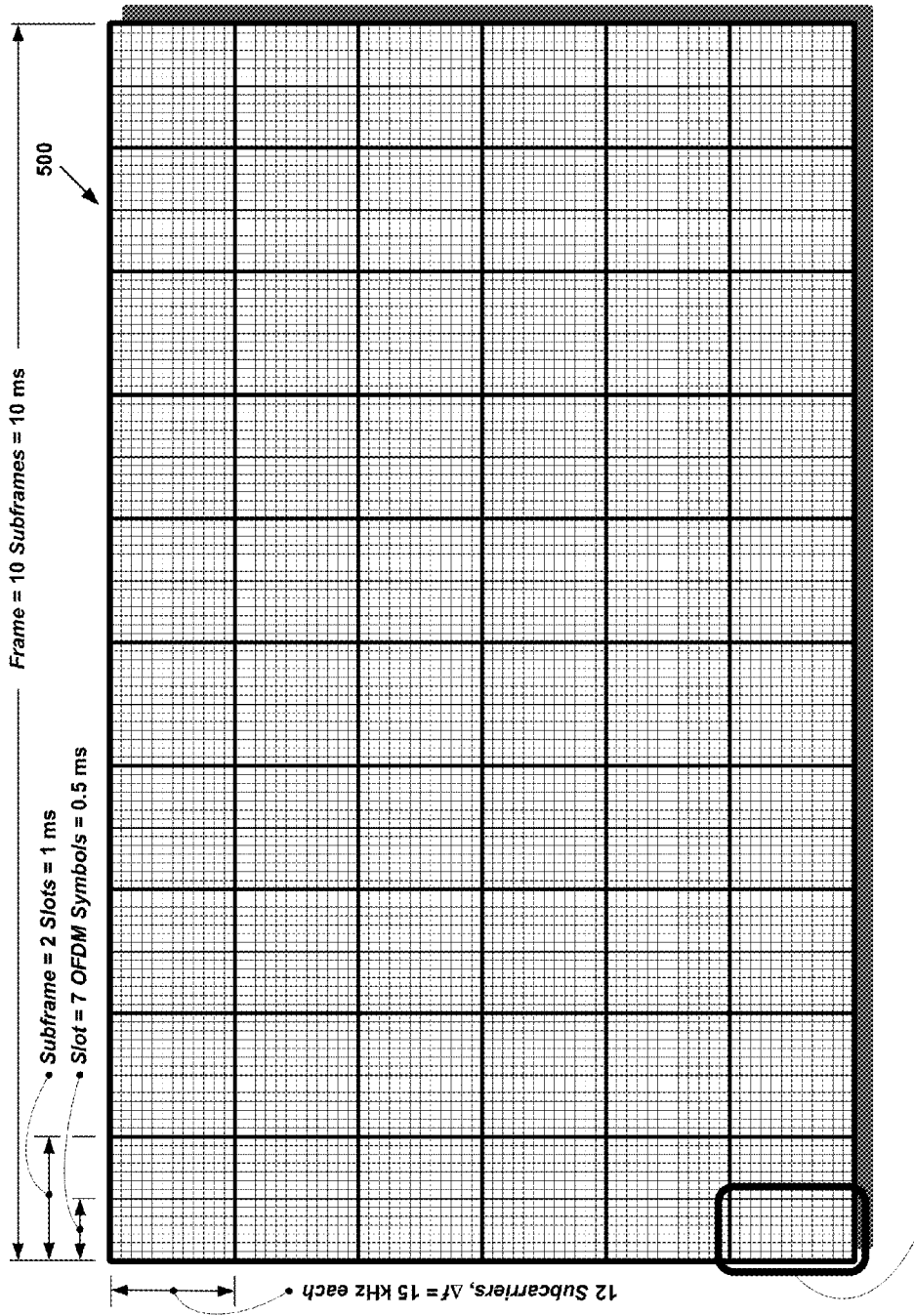
FIG. 5 is an illustrative representation of a radio transmission frame, in accordance with example embodiments.

Example embodiments of reuse of contention-free preamble codes for random access requests can be described, again by way of example, in the context of LTE Advanced. As discussed above, LTE transmissions are organized in transmission frames. FIG. 5 illustrates an example of an LTE radio transmission frame 500. As shown in FIG. 5, an LTE radio transmission frame can be described as grid of OFDM symbols arrayed in time and RF carriers in frequency. Specifically, in the time dimension, a frame contains ten subframes, each one ms in duration, for a total frame duration of 10 ms. Each subframe is made up of two consecutive 0.5 ms slots, and each slot contains 7 OFDM symbols (as noted above, a slot can contain 6 OFDM symbols in some configurations). The frequency dimension is made up multiple, contiguous frequency carrier bands, each subdivided into 12 contiguous 15-kHz wide subcarriers for a total bandwidth of 180 kHz per frequency carrier band. The frequency of each subcarrier is an integer multiple of a base frequency, making the subcarriers orthogonal. The number of frequency carrier bands in a frame depends on what portion or portions of the RF spectrum is licensed by the service provider. The example radio frame 500 in FIG. 5 includes six frequency bands. Other numbers are possible as well.

Every 7 contiguous OFDM symbols of a slot by 12 subcarriers of a carrier band makes up a unit referred to as a resource block (RB). Thus, each frame contains 20 RBs in the time dimension and a deployment-specific number carrier bands in the frequency dimension. Each element of a resource block, referred to as a resource element, corresponds to an OFDM symbol at a particular time and frequency subcarrier of a RB. Each OFDM symbol of a resource element is a time domain symbol generated from Fourier superposition frequency domain symbols. As described above, a receiving device (e.g., a UE on a downlink or an eNodeB on an uplink) will receive a superposition signal that can be Fourier decomposed to recover the symbols in the frequency domain. In FIG. 5, resource elements are represented by the smallest array elements shown. The organization of resource elements into RBs, RB into slots, slots into subframes, and subframes into the frame 500 is indicated in FIG. 5 in correspondence with the above description.

In LTE, air interface resources are allocated in units of RBs. One RB is the smallest unit of allocation made for a downlink transmission to a given UE. As discussed above, allocations are typically made by an eNodeB serving the given UE, and more than one RB can be allocated for the UE. Multiple RB allocations for a given UE can be made across multiple frequency carrier bands, across multiple time slots, or both, depending on factors including the amount of data to be transmitted to the UE, the type of data (e.g., best-effort, real-time, etc.), and downlink resources needed for other UEs.

Also as discussed above, LTE can be deployed in a frequency division duplex (FDD) mode or a time division duplex (TDD) mode. In FDD LTE, the uplink and downlink occupy different blocks of RF spectrum, so transmission frames, such as frame 500, are dedicated to only uplink transmissions within a RF block allocated for the uplink, or only downlink transmissions within a RF block allocated for the downlink. In TDD LTE, the uplink and downlink share the same block of RF spectrum, so uplink and downlink transmissions are allocated specific time windows. More particularly, each transmission frame is configured with certain subframes allocated for uplink transmission, and certain, other subframes allocated for downlink transmissions. The specific configuration of uplink and downlink subframes per frame in TDD LTE can be set according to defined standards, for example.

For both FDD LTE and TDD LTE, the PRACH is supported by designating certain RBs of the uplink for the purpose of carrying random access requests (i.e., RACH preambles) from UEs seeking network access. In doing so, the PRACH is implemented in one or more PRACH instances corresponding to one or more different RB allocations within a transmission frame. In particular, for TDD LTE, different PRACH instances are specific allocated RBs among the uplink time slots of the transmission frame.

Because uplink time slots typically represent only a portion of the 10 time slots that make up each frame in TDD LTE, the number of time slots that can accommodate PRACH instances is reduced in TDD LTE compared with that in FDD LTE. One way that this reduced capacity for PRACH instances can be compensated is to configure multiple PRACH instances in a given uplink time slot by placing them within different frequency bands of a frame. This can be done by using RBs in different frequency bands of a given uplink time slot for different instances of the PRACH. In this way, the PRACH capacity in slots containing more than one PRACH instance can be effectively boosted.

Figure 6:
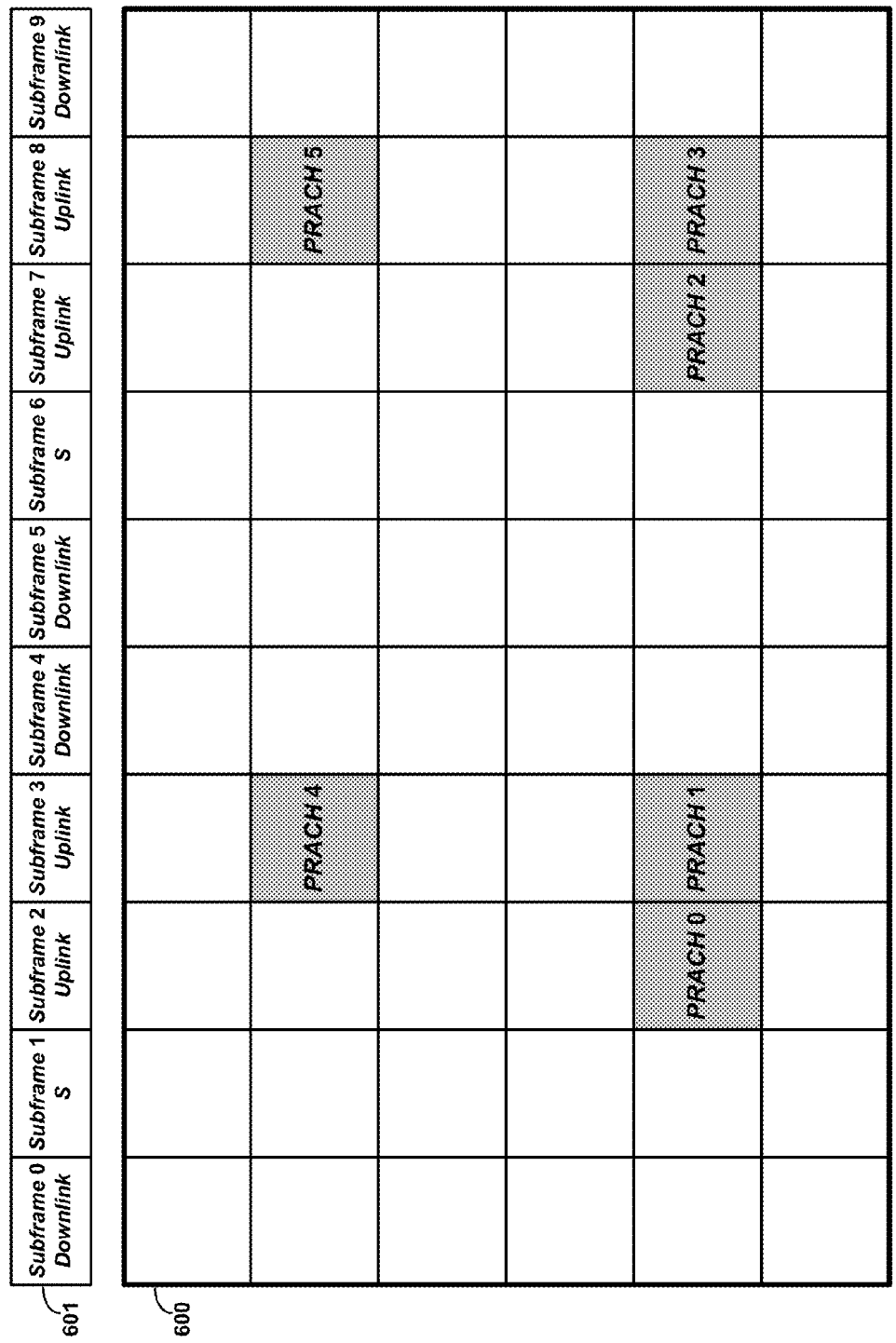
FIG. 6 illustrates an example configuration of instances of a random access channel within a radio transmission frame, in accordance with example embodiments.

FIG. 6 illustrates an example LTE transmission frame 600 configured with six PRACH instances, including pairs that share the same uplink subframe. In a subframe label header 601 (shown for purposes of explanation), the subframes are labeled from 0, . . . , 9, and each is designated as uplink, downlink, or transition (labeled "S"). For the sake of brevity, individual time slots, RBs, and resource elements are not displayed in the frame 600, and the different frequency bands, represented as different rows in the frame 600, are not labeled. By way of example, the configuration shown is designated in LTE as "TDD PRACH configuration index 18 with UL:DL configuration 1 and preamble format 0." It will be appreciated that other frame configurations could be used as well. In usual operation, the frame configuration is broadcast to UEs in "SIB2" message.

As shown, the configuration of frame 600 includes at least one PRACH instance in each uplink subframe. Specifically, uplink subframe 2 includes PRACH 0; uplink subframe 3 includes PRACH 1; uplink subframe 7 includes PRACH 2; and uplink subframe 8 includes PRACH 3. In addition, uplink subframe 3 also includes PRACH 4 and uplink subframe 8 also includes PRACH 5. Thus, each of uplink subframes 3 and 8 are configured with two PRACH instances (1 and 4, or 3 and 5) in different RBs.

In conventional operation of contention-free random access under LTE, and TDD LTE in particular, the target eNodeB assigns just a contention-free RACH preamble to a given UE preparing to engage in contention-free random access. But the target eNodeB does not specify a particular PRACH instance to use. As such, reuse of contention-free RACH preambles cannot be achieved with conventional operations, because there is no way to assure that two different UEs, both assigned the same (reused) contention-free preamble, won't transmit their identical random access requests in the same PRACH instance. Instead, in conventional contention-free random access, the eNodeB assigns a given contention-free RACH preambles at different times to different UEs for non-concurrent use, or assigns two or more different contention-free RACH preambles for concurrent use by two or more different UEs. Referring again to FIG. 4, in conventional operation, the UEs 402-1-*a* and 402-2-*a* can only be assigned a different contention-free RACH preamble for making their concurrent random access requests.

Example embodiments described herein, however, provide for concurrent reuse of contention-free RACH preambles. In accordance with example embodiments, a target eNodeB (e.g., eNodeB 404-2) can both assign a particular contention-free preamble, and specify a particular PRACH instance to a UE that will engage in contention-free random access (e.g., UEs 402-1-*a* and 402-2-*a*). In particular, the eNodeB can assign an identical contention-free RACH preamble code, but different PRACH instance of a given subframe, to each of two or more UEs for use in concurrent random access requests by the UEs. The UEs, in turn, can concurrently transmit their identical random access requests in their respectively specified (and different) PRACH instances. Because PRACH instances in the same uplink subframe are configured in different RBs, identical contention-free RACH preamble codes can be transmitted at the same time by different UEs, without interfering.

More specifically, in further accordance with example embodiments, when a target eNodeB receives multiple, identical contention-free RACH preamble codes in different PRACH instances of the same uplink subframe, the target eNodeB can successfully decode each of the received identical contention-free RACH preamble codes. Each decoded random access request will yield the same contention-free RACH preamble code. However, because the target eNodeB will have assigned not only the contention-free RACH preamble code to each UE, but also will have specified which PRACH instance to use, the eNodeB will be able to correctly associate each received, identical contention-free RACH preamble code with the particular UE that sent it.

Referring again to FIG. 6, when a target eNodeB assigns a contention-free RACH preamble code to a UE for use in contention-free random access request, the target eNodeB will also specify that the UE use one of the specific PRACH instances 0, . . . , 5 (for the example frame configuration shown). In particular, the target eNodeB can assign the same RACH preamble code to two different UEs for use at the same time by also specifying PRACH 1 to one of the two UEs and PRACH 4 to the other. Similarly, the target eNodeB can assign the same RACH preamble code to two different UEs for use at the same time by also specifying PRACH 3 to one of the two UEs and PRACH 3 to the other. Since PRACH 1 and PRACH 4 are configured in different RBs of subframe 3, concurrent transmissions of the identical RACH preamble code from two different UEs will not interfere with one another. Similarly, since PRACH 3 and PRACH 5 are configured in different RBs of subframe 8, concurrent transmissions of the identical RACH preamble code from two different UEs also will not interfere with one another. Thus, by specifying a specific PRACH instance to use for contention-free random access requests, RACH preamble codes can be reused on a concurrent basis.

In accordance with example embodiments, a reuse multiplicity factor (or reuse capacity) can be determined based on how many concurrent transmissions of identical RACH preamble codes can be concurrently transmitted by different UEs. As describe, the number of such concurrent transmissions follows from the maximum number of PRACH instances configured in a given one of the uplink subframes. More generally, the number of such concurrent transmissions can depend on the number of air-interface resources are configured for carrying non-interfering, identical uplink transmissions from two or more WCDs at the same time.

The reuse multiplicity factor, in turn, can be used to determine how many of an eNodeB's total number of RACH preamble codes to reserve for contention-free random access, and how many can remain available for contention-based random access. As the reuse multiplicity factor increases, the number of contention-free preamble codes needed to achieve a given success rate of contention-free random requests will tend to decrease, leaving more contention-based preamble codes available. Alternatively, as the reuse multiplicity factor increases, the success rate of contention-free random requests for a given number of reserved contention-free preamble codes will tend to increase. Either way, reuse of contention-free preamble codes, in accordance with example embodiments, can enhance and improve system performance related to random access requests.

Example Devices

As described above, the example embodiments involve actions and operations carried out by a base station (e.g., an eNodeB) and a WCD (e.g., a UE). Accordingly, the example embodiments can be implemented as aspects of each type of device. Example devices for carrying out reuse of identifiers for random access requests for network access are described below.

a. Example Base Station

Figure 7:
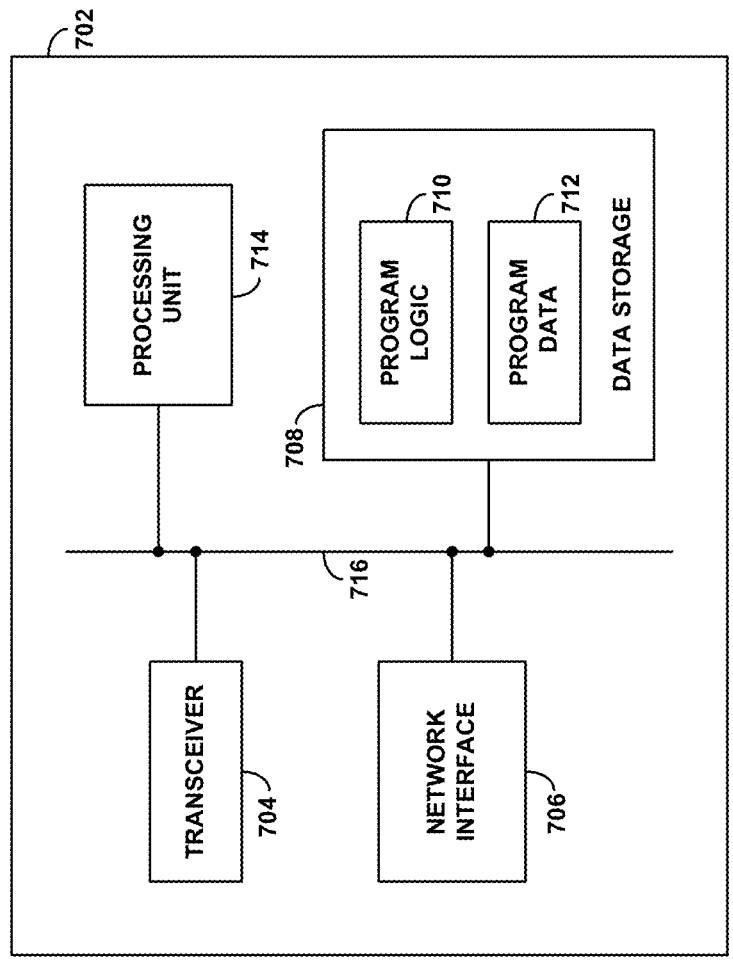
FIG. 7 is a simplified block diagram of a base station configured for carrying out an example method of reuse of identifiers for random access requests for network access, in accordance with example embodiments.

FIG. 7 is a simplified block diagram depicting functional components of an example base station 702, such as the eNodeB 308, in which an example embodiment of reuse of identifiers for random access requests for network access could be implemented. As shown in FIG. 7, the example base station 702 includes a transceiver 704, network interface 706, a processing unit 714, and data storage 708, all of which may be coupled together by a system bus 716 or other mechanism. In addition, the base station 702 may also include external storage, such as magnetic or optical disk storage, although this is not shown in FIG. 7.

These components may be arranged to support wireless communications in a wireless communication network that is compliant with a variety of wireless air-interface protocols, such as network 300 illustrated in FIG. 3. In particular, these components can support reuse of identifiers for random access requests for network access, in accordance with example embodiments.

Network interface 706 enables communication on a network, such network 300. As such, network interface 706 may take the form of an Ethernet network interface card or other physical interface to a broadband connection to the internet or some other data network. Further, the base station 702 can also include a transceiver 704, which may include one or more antennas, enables air interface communication with one or more WCDs, supporting both downlink (or forward link) and uplink (or reverse link) transmissions.

Processing unit 714 comprises one or more general-purpose processors (e.g., INTEL microprocessors) and/or one or more special-purpose processors (e.g., dedicated digital signal processor, application specific integrated circuit, etc.). In turn, the data storage 708 comprises one or more volatile and/or non-volatile storage components, such as magnetic or optical memory or disk storage. Data storage 708 can be integrated in whole or in part with processing unit 714, as cache memory or registers for instance. As further shown, data storage 708 is equipped to hold program logic 710 and program data 712.

Program data 712 may comprise data configuration parameters. Program logic 710 may comprise machine language instructions that define routines executable by processing unit 714 to carry out various functions described herein. In particular the program logic, communication interface, and transceiver may operate cooperatively to carry out logical operation, such as that described by way of example in FIG. 1, as well other functions discussed above.

It will be appreciated that there can be numerous specific implementations of a base station, such as base station 702, in which reuse of identifiers for random access requests for network access could be implemented. Further, one of skill in the art would understand how to devise and build such an implementation. As such, base station 702 is representative of means for carrying out reuse of identifiers for random access requests for network access, in accordance with the methods and steps described herein by way of example.

b. Example WCD

Figure 8:
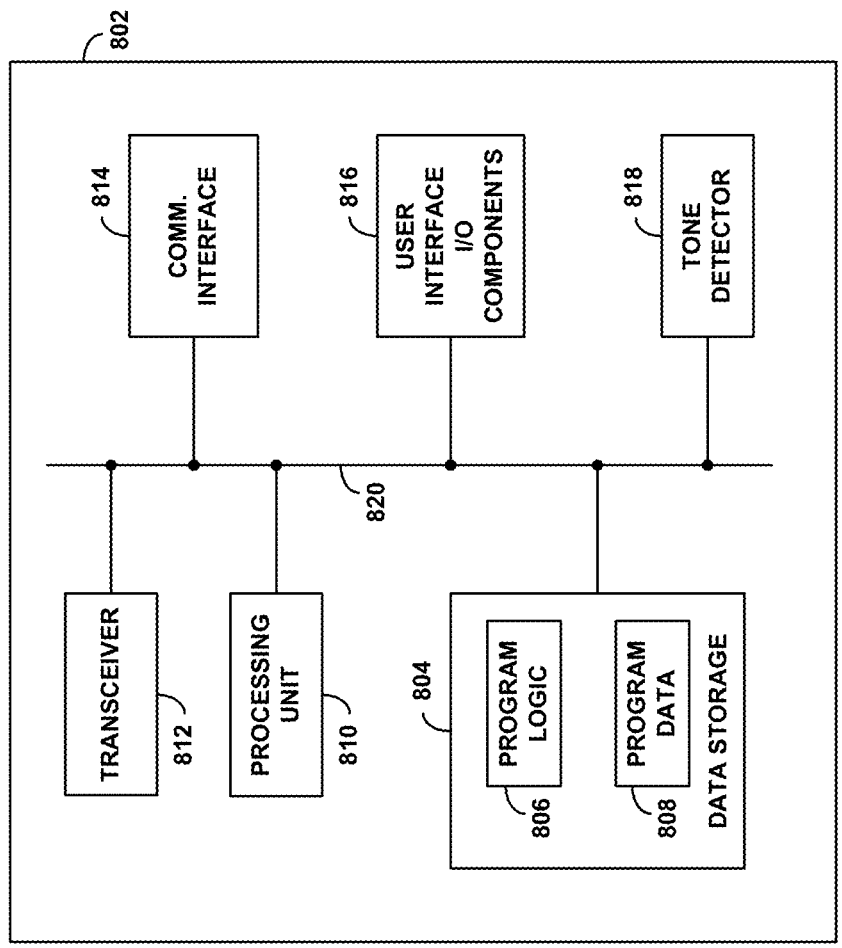
FIG. 8 is a simplified block diagram of a wireless communication device configured for carrying out an example method of reuse of identifiers for random access requests for network access, in accordance with example embodiments.

FIG. 8 is a simplified block diagram depicting functional components of an example WCD 802 in which an example embodiment of reuse of identifiers for random access requests for network access could be implemented. The example WCD 802 could be a cell phone, a personal digital assistant (PDA), a pager, a wired or wirelessly-equipped notebook computer, or any other sort of device. As shown in FIG. 8, the example WCD 802 includes data storage 804, processing unit 810, transceiver 812, communication interface 814, user-interface I/O components 816, and tone detector 818, all of which may be coupled together by a system bus 820 or other mechanism.

These components may be arranged to support operation in a wireless communication network that is compliant with a variety of wireless air-interface protocols, such as network 300 illustrated in FIG. 3. In particular, these components can support concurrent communication on two or more air interfaces, in accordance with example embodiments.

Communication interface 814 in combination with transceiver 812, which may include one or more antennas, enables communication with the network, transmission of communication units to the network, and reception of communication units from the network. By way of example, the communication interface could include a module, such as an MSM™-series chipset made by Qualcomm Inc. of San Diego, Calif., and supports wireless packet-data communications according to a CDMA family of protocols. Other communication interface hardware and/or firmware could be used as well.

Processing unit 810 comprises one or more general-purpose processors (e.g., INTEL microprocessors) and/or one or more special-purpose processors (e.g., dedicated digital signal processor, vocoder, application specific integrated circuit, etc.). In turn, the data storage 804 comprises one or more volatile and/or non-volatile storage components, such as magnetic or optical memory or disk storage. Data storage 804 can be integrated in whole or in part with processing unit 810, as cache memory or registers for instance. In example WCD 802, as shown, data storage 804 is configured to hold both program logic 806 and program data 808.

Program logic 806 may comprise machine language instructions that define routines executable by processing unit 810 to carry out various functions described herein. In particular the program logic, communication interface, and transceiver may operate cooperatively to carry out logical operation, such as reuse of identifiers for random access requests for network access, and other functions discussed above.

It will be appreciated that there can be numerous specific implementations of an access terminal, such as WCD 802, in which reuse of identifiers for random access requests for network access could be implemented. Further, one of skill in the art would understand how to devise and build such an implementation. As such, WCD 802 is representative of means for carrying out reuse of identifiers for random access requests for network access, in accordance with the methods and steps described herein by way of example.

4. Conclusion

An example embodiment has been described above. Those skilled in the art will understand, however, that changes and modifications may be made to this embodiment without departing from the true scope and spirit, which is defined by the claims.

We claim:

1. A method implemented by a base station of a wireless communication system, the method comprising:
   configuring a first air-interface resource and a second air-interface resource for concurrent, non-interfering transmissions by two different wireless communication devices (WCDs) of identical random access requests to the base station;
   transmitting a first message to a first WCD, the first message containing a particular identifier for use in a first contention-free random access request to the base station, the first message further indicating to the first WCD the first air-interface resource for use by the first WCD in transmission of the first contention-free random access request; and
   transmitting a second message to a second WCD, the second message containing the particular identifier for use in a second contention-free random access request to the base station, the second message further indicating to the second WCD the second air-interface resource for use by the second WCD in transmission of the second contention-free random access request,
   wherein the first contention-free access request and the second contention-free access request are each identified only by the particular identifier.

2. The method of claim 1, further comprising:
   concurrently receiving the first and second contention-free random access requests; and
   distinguishing between the first and second contention-free random access requests based on a difference between the first air-interface resource and the second air-interface resource.

3. The method of claim 2, further comprising:
transmitting to the first WCD a first response to the received first contention-free random access request; and
transmitting to the second WCD a second response to the received second contention-free random access request.

4. The method of claim 1, wherein transmitting the first message to the first WCD comprises transmitting the first message via a first intermediate base station to the first WCD,
and wherein transmitting the second message to the second WCD comprises transmitting the second message via a second intermediate base station to the second WCD,
wherein the first and second intermediate base stations are one of the same or different.

5. The method of claim 1, wherein the first air-interface resource comprises a given time window for transmission and a first set of radio-frequency (RF) carrier frequencies,
and wherein the second air-interface resource comprises the given time window for transmission and a second set of RF carrier frequencies.

6. The method of claim 1, wherein the first air-interface resource comprises a first radio-frequency (RF) domain of a random access channel,
and wherein the second air-interface resource comprises a second RF domain of the random access channel.

7. The method of claim 1, wherein the base station maintains a pool of distinct identifiers for use by WCDs in random access requests, the pool of distinct identifiers including (i) a first number of identifiers selectable at random by WCDs for contention-based random access requests, none of which guarantees against contending random access requests due to concurrent selection of a common identifier by multiple WCDs, and (ii) a second number of identifiers, including the particular identifier, reserved for assignment by the base station to WCDs for contention-free random access requests,
wherein transmitting the first message to the first WCD comprises assigning both the particular identifier and the first air-interface resource to the first WCD,
and wherein transmitting the second message to the second WCD comprises assigning both the particular identifier and the second air-interface resource to the second WCD.

8. The method of claim 7, wherein the first and second air-interface resources are two of N≥2 air-interface resources that support concurrent, non-interfering transmissions by N different WCDs of identical random access requests to the base station,
and wherein the method further comprises determining a relative size of the first and second numbers of identifiers based at least in part on N.

9. The method of claim 1, wherein the wireless communication system is configured to operate according to at least Long Term Evolution (LTE),
wherein transmissions from the base station to WCDs are carried on downlinks comprising downlink resource blocks (RBs) in downlink subframes, and transmissions from WCDs to the base station are carried on uplinks comprising uplink RBs in uplink subframes,
wherein random access requests are transmitted by WCDs on a physical random access channel (PRACH) comprising one or more PRACH instances, each PRACH instance comprising a different uplink RB in a given uplink subframe,
wherein random access requests are identified by preambles,
wherein the base station maintains a pool of distinct preambles for use by WCDs in random access requests, the pool of distinct preambles including (i) a first number of preambles selectable at random by WCDs for contention-based random access requests, and (ii) a second number of preambles reserved for assignment by the base station to WCDs for contention-free random access requests,
wherein transmitting the first message to the first WCD comprises assigning both a particular preamble and a first PRACH instance of a particular uplink subframe to the first WCD,
and wherein transmitting the second message to the second WCD comprises assigning both the particular preamble and a second, different PRACH instance of the particular uplink subframe to the second WCD.

10. The method of claim 1, further comprising:
configuring a third air-interface resource for an additional concurrent, non-interfering transmission by a WCD of the identical random access request to the base station; and
transmitting a third message to a third WCD, the third message containing the particular identifier for use in a third contention-free random access request to the base station, the third message further indicating to the third WCD the third air-interface resource for use by the third WCD in transmission of the third contention-free random access request,
wherein the third contention-free access request is identified only by the particular identifier.

11. A base station configured for operating in a wireless communication system, the base station comprising:
one or more processors;
memory accessible by the one or more processors; and
machine-readable instructions stored in the memory, that upon execution by the one or more processors cause the base station to carry out functions including:
configuring a first air-interface resource and a second air-interface resource for concurrent, non-interfering transmissions by two different wireless communication devices (WCDs) of identical random access requests to the base station,
transmitting a first message to a first WCD, wherein the first message contains a particular identifier for use in a first contention-free random access request to the base station, and the first message further indicates to the first WCD the first air-interface resource for use by the first WCD in transmission of the first contention-free random access request, and
transmitting a second message to a second WCD, wherein the second message contains the particular identifier for use in a second contention-free random access request to the base station, and the second message further indicates to the second WCD the second air-interface resource for use by the second WCD in transmission of the second contention-free random access request,
wherein the first contention-free access request and the second contention-free access request are each identified only by the particular identifier.

12. The base station of claim 11, wherein transmitting the first message to the first WCD comprises transmitting the first message via a first intermediate base station to the first WCD,
and wherein transmitting the second message to the second WCD comprises transmitting the second message via a second intermediate base station to the second WCD,
wherein the first and second intermediate base stations are one of the same or different.

13. The base station of claim 11, wherein the first air-interface resource comprises a given time window for transmission and a first set of radio-frequency (RF) carrier frequencies,
    and wherein the second air-interface resource comprises the given time window for transmission and a second set of RF carrier frequencies.

14. The base station of claim 11, wherein the base station maintains a pool of distinct identifiers for use by WCDs in random access requests, the pool of distinct identifiers including (i) a first number of identifiers selectable at random by WCDs for contention-based random access requests, none of which guarantees against contending random access requests due to concurrent selection of a common identifier by multiple WCDs, and (ii) a second number of identifiers, including the particular identifier, reserved for assignment by the base station to WCDs for contention-free random access requests,
    wherein transmitting the first message to the first WCD comprises assigning both the particular identifier and the first air-interface resource to the first WCD,
    and wherein transmitting the second message to the second WCD comprises assigning both the particular identifier and the second air-interface resource to the second WCD.

15. The base station of claim 11, wherein the wireless communication system is configured to operate according to at least Long Term Evolution (LTE),
    wherein transmissions from the base station to WCDs are carried on downlinks comprising downlink resource blocks (RBs) in downlink subframes, and transmissions from WCDs to the base station are carried on uplinks comprising uplink RBs in uplink subframes,
    wherein random access requests are transmitted by WCDs on a physical random access channel (PRACH) comprising one or more PRACH instances, each PRACH instance comprising a different uplink RB in a given uplink subframe,
    wherein random access requests are identified by preambles,
    wherein the base station maintains a pool of distinct preambles for use by WCDs in random access requests, the pool of distinct preambles including (i) a first number of preambles selectable at random by WCDs for contention-based random access requests, and (ii) a second number of preambles reserved for assignment by the base station to WCDs for contention-free random access requests,
    wherein transmitting the first message to the first WCD comprises assigning both a particular preamble and a first PRACH instance of a particular uplink subframe to the first WCD,
    and wherein transmitting the second message to the second WCD comprises assigning both the particular preamble and a second, different PRACH instance of the particular uplink subframe to the second WCD.

16. A non-transitory computer-readable medium having instructions stored thereon that, upon execution by one or more processors of a base station, cause the base station to carry out functions including:
    configuring a first air-interface resource and a second air-interface resource for concurrent, non-interfering transmissions by two different wireless communication devices (WCDs) of identical random access requests to the base station;
    transmitting a first message to a first WCD, wherein the first message contains a particular identifier for use in a first contention-free random access request to the base station, and the first message further indicates to the first WCD the first air-interface resource for use by the first WCD in transmission of the first contention-free random access request; and
    transmitting a second message to a second WCD, wherein the second message contains the particular identifier for use in a second contention-free random access request to the base station, and the second message further indicates to the second WCD the second air-interface resource for use by the second WCD in transmission of the second contention-free random access request,
    wherein the first contention-free access request and the second contention-free access request are each identified only by the particular identifier.

17. The non-transitory computer-readable medium of claim 16, wherein transmitting the first message to the first WCD comprises transmitting the first message via a first intermediate base station to the first WCD,
    and wherein transmitting the second message to the second WCD comprises transmitting the second message via a second intermediate base station to the second WCD,
    wherein the first and second intermediate base stations are one of the same or different.

18. The non-transitory computer-readable medium of claim 16, wherein the first air-interface resource comprises a first radio-frequency (RF) domain of a random access channel,
    and wherein the second air-interface resource comprises a second RF domain of the random access channel.

19. The non-transitory computer-readable medium of claim 18, wherein the base station is configured to maintain a pool of distinct identifiers for use by WCDs in random access requests, the pool of distinct identifiers including (i) a first number of identifiers selectable at random by WCDs for contention-based random access requests, none of which guarantees against contending random access requests due to concurrent selection of a common identifier by multiple WCDs, and (ii) a second number of identifiers, including the particular identifier, reserved for assignment by the base station to WCDs for contention-free random access requests,
    wherein transmitting the first message to the first WCD comprises assigning both the particular identifier and the first air-interface resource to the first WCD,
    and wherein transmitting the second message to the second WCD comprises assigning both the particular identifier and the second air-interface resource to the second WCD.

20. The non-transitory computer-readable medium of claim 16, wherein the wireless communication system is configured to operate according to at least Long Term Evolution (LTE),
    wherein transmissions from the base station to WCDs are carried on downlinks comprising downlink resource blocks (RBs) in downlink subframes, and transmissions from WCDs to the base station are carried on uplinks comprising uplink RBs in uplink subframes,
    wherein random access requests are transmitted by WCDs on a physical random access channel (PRACH) comprising one or more PRACH instances, each PRACH instance comprising a different uplink RB in a given uplink subframe,
    wherein random access requests are identified by preambles,
    wherein the base station is configured to maintain a pool of distinct preambles for use by WCDs in random access requests, the pool of distinct preambles including (i) a first number of preambles selectable at random by WCDs for contention-based random access requests, and (ii) a second number of preambles reserved for assignment by the base station to WCDs for contention-free random access requests, wherein transmitting the first message to the first WCD comprises assigning both a particular preamble and a first PRACH instance of a particular uplink subframe to the first WCD, and wherein transmitting the second message to the second WCD comprises assigning both the particular preamble and a second, different PRACH instance of the particular uplink subframe to the second WCD.

* * * * *